Patented Feb. 24, 1931

1,793,941

UNITED STATES PATENT OFFICE

JULIUS LAUX, OF UERDINGEN NIEDERRHEIN, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

IRON-OXIDE PIGMENT AND PROCESS OF PRODUCING THE SAME AS BY-PRODUCTS OF THE REDUCTION OF AROMATIC NITRO COMPOUNDS

No Drawing. Application filed August 12, 1929, Serial No. 385,456, and in Germany May 8, 1925.

The present invention relates to a process of producing iron oxide pigments; more specifically it relates to a process in which a finely divided iron oxide suitable as a pigment is obtained as a by-product from the reduction of aromatic nitro compounds to the corresponding amines by means of iron and a solution of a salt of an organic amino compound. The invention also embraces the resulting products.

In the methods of producing aromatic amines from aromatic nitro compounds heretofore known and used for a long time involving the use of iron and a solution of a salt of an organic amino compound the iron which is used as the reducing agent generally changes into a brownish black oxide whose composition corresponds to a formula lying between $Fe_3O_4$ and $Fe_2O_3$. This oxide is not useful as a color pigment and is of very inferior quality on account of its slight coloring and covering power.

To illustrate the old process it may be stated that in the manufacture of aniline with every 100 parts by weight of nitro benzene about 100 parts by weight of iron, 8 to 10 parts by weight of hydrochloric acid (specific gravity 1.16) and about 100 parts by weight of water are used. The reduction is carried out by adding the nitrobenzene and iron to the hydrochloric acid and water heated to about 100° C. at such a rate that the temperature of about 100° C. is maintained due to the heat of reaction. When reduction is finished, the oily layer of aniline is drawn off and the remaining liquid distilled by means of steam after having added some lime, if necessary. The sludge of oxidized iron thus obtained represents a waste product of no commercial value. As is further known, the hydrochloric acid may be substituted by other acids or by the equivalent amount of aniline hydrochloride which exerts an acid reaction due to hydrolysis. It follows from the figures given above that the concentration of aniline hydrochloride in the aqueous phase of the reaction mixture does not essentially exceed 10 percent.

According to this invention, the reduction is carried out under such conditions that the aqueous phase of the reaction mixture is a highly concentrated solution of a salt of an organic amino compound and preferably a solution of a salt of the same amine which results from the process itself is employed, that is, the concentration of the aforesaid salt in the aqueous phase should at least amount to 25 percent and should not fall below this amount during the reduction process. This is effected by adding enough of an easily soluble amine salt to the water necessary for reduction, so that a solution of the desired high concentration results or, what in practice amounts to the same thing, by starting from a solution of an amine salt having the desired strength instead of a mixture of concentrated acid and water.

The easily soluble salts which are chiefly used are those of aromatic amines both with inorganic and with organic acids provided they have a solubility high enough to attain the minimum concentration specified above. Since these salts react acid, that is, they undergo a hydrolysis with liberation of hydrogen ions, the special addition of an acid can be dispensed with. As I have mentioned above, I prefer to use a concentrated solution of a salt of the same amine which results from the reduction i. e. if nitrobenzene is reduced to aniline, a solution of an aniline salt is employed; in case a toluidine is made, I start from a solution of a salt of the same toluidine etc. Among the salts suitable for carrying out this process the following are named: aniline hydrochloride, aniline acetate, aniline sulfate.

The quantity of amine salt required for reduction is very low; 3 to 4 parts by weight of amine salt for 100 parts by weight of nitro compound are sufficient for reduction but I prefer to use a multiple amount thereof in order to have the aqueous phase of the reaction mixture not become too slight.

If the reduction is carried out in the presence of such a concentrated solution of an easily soluble salt of an organic amino compound (the process not essentially departing in other respects from the customary processes as will be evidenced by the examples set forth), there remains after the separation of the aromatic amine, for example, aniline resulting from the nitro compound a slurry which contains the oxidized iron in a most finely divided state and, in fact, in most cases as a deep black ferroso-ferric oxide $Fe_3O_4$. After levigation washing out and drying, it is useful as a color pigment either directly or, if red shades are desired, after being subjected to a preliminary calcination.

The process is illustrated by the following examples (the parts being by weight). It will be understood that it is capable of being carried out with other nitro compounds than those mentioned in the examples, for instance, with chloro-, hydroxy- and amino-nitro compounds, poly-nitro compounds, and nitro-sulfonic acids. Other easily soluble amine salts can be employed in place of the salts named in the examples.

*Example 1*

200 parts of nitrobenzene are allowed to run at 100° C. into a solution of 70 parts of aniline hydrochloride in 150 kgs. of water containing about 180 parts of iron powder, in such a way that the temperature maintains itself at 100° C. due to the reaction heat. When reduction is finished, the resulting aniline is separated in the known manner. There remains behind a highly valuable deep black ferroso-ferric oxide which is freed from unattacked iron and from soluble salts and then dried. It is converted to a bright red iron oxide by calcining it at about 800° C.

*Example 2*

150 parts of water, 48 parts of α-naphthyl amine, 35 parts of a 35% hydrochloric acid and 250 parts of finely ground iron are heated to about 100° C. and 200 parts of nitrobenzene and 40 parts of water are added to the mixture in small portions. When reduction is finished, the aniline is separated in the known way and a bluish black ferroso-ferric oxide remains behind after levigating, washing and drying the residue. By calcining it a red iron oxide of violet shade is obtained.

*Example 3*

85 parts of water, 26 parts of o-toluidine, 70 parts of a 40% hydrobromic acid and 250 parts of finely ground iron are heated to about 100° C. 200 parts of o-toluene and 50 parts of water are added to the mixture in small portions. After separation of the o-toluidine a deep black ferroso-ferric oxide is obtained. By calcining it a red iron oxide of bluish shade is produced.

*Example 4*

200 parts of nitrobenzene and 60 parts of water are allowed to run into a mixture of 100 parts of water, 31 parts of aniline, 20 parts of glacial acetic acid and 250 parts of finely ground iron at about 100° C. The working up as shown in Example 1 yields a black iron oxide pigment of greyish shade which is converted to a brilliant yellowish red iron oxide by calcining it.

*Example 5*

170 parts of a 20% sulfuric acid, 64 parts of aniline and 250 parts of finely ground iron are heated to about 100° C. 200 parts of nitrobenzene and 60 parts of water are added to this mixture at such a rate that the temperature of about 100° C. is maintained due to the heat of reaction. The working up as shown in example 1 yields a black iron oxide pigment of greyish shade which is converted to a lustrous red iron oxide by calcining it.

This is a continuation in part of my co-pending application Serial No. 197,219 filed June 7, 1927.

I claim:

1. The process which comprises reducing an aromatic nitro compound with metallic iron and an aqueous solution containing at least 25 percent of a salt of an organic amino compound, separating the resulting iron oxide sludge from the resulting aromatic amino compound and purifying the iron oxide sludge by washing.

2. The process which comprises reducing an aromatic nitro compound with metallic iron and an aqueous solution containing at least 25 percent of a salt of an organic amino compound, separating the resulting iron oxide sludge from the resulting aromatic amino compound, purifying the iron oxide sludge by levigation, washing out, drying and calcining.

3. The process which comprises reducing an aromatic nitro compound with metallic iron and an aqueous solution containing at least 25 percent of a salt of an aromatic amino compound, separating the resulting iron oxide sludge from the resulting aromatic amino compound, and purifying the former by washing.

4. The process which comprises reducing an aromatic nitro compound with metallic iron and an aqueous solution containing at least 25 percent of a salt of the aromatic amine corresponding to the nitro compound, separating the resulting iron oxide sludge from the resulting aromatic amino compound, and purifying the former by washing.

5. The process which comprises reducing an aromatic nitro compound with metallic iron and an aqueous solution containing at least 25 percent of the hydrochloric acid salt of the aromatic amine corresponding to the nitro compound, separating the resulting iron oxide sludge from the resulting aromatic amino compound, and purifying the former by washing 6. The process which comprises reducing nitrobenzene with metallic iron and an aqueous solution containing at least 25 percent of aniline hydrochloride, separating the resulting iron oxide sludge from the resulting aniline, and washing the sludge.

In testimony whereof, I affix my signature.

JULIUS LAUX.